(12) United States Patent
Huang et al.

(10) Patent No.: US 10,308,461 B2
(45) Date of Patent: Jun. 4, 2019

(54) ROLLER ASSEMBLY AND METHOD FOR TRANSPORTING A SUBSTRATE USING THE SAME

(71) Applicant: Industrial Technology Research Institute, Hsinchu (TW)

(72) Inventors: Kuo-Hsin Huang, Hsinchu County (TW); Chao-Feng Sung, Hsinchu (TW); Yu-Lin Hsu, Tainan (TW); Hsin-Yun Hsu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 218 days.

(21) Appl. No.: 15/361,087

(22) Filed: Nov. 25, 2016

(65) Prior Publication Data

US 2018/0148262 A1    May 31, 2018

(51) Int. Cl.
   *B65H 20/02* (2006.01)
   *B65G 35/04* (2006.01)
   (Continued)

(52) U.S. Cl.
   CPC ............. *B65H 20/02* (2013.01); *B65G 35/04* (2013.01); *B65G 39/02* (2013.01); *B65H 23/34* (2013.01);
   (Continued)

(58) Field of Classification Search
   CPC ........ B65G 15/12; B65G 15/58; B65G 35/04; B65G 39/02; B65G 49/05; B65G 49/06; B65G 2201/022; B65G 2207/02; B65H 20/02; B65H 20/04; B65H 20/06; B65H 20/08; B65H 20/10; B65H 20/12; B65H 20/34; B65H 23/32; B65H 23/34;
   (Continued)

(56) References Cited

U.S. PATENT DOCUMENTS 2,082,895 A * 6/1937 Knowland ............. B65H 20/06
                                                      264/288.4
2,979,829 A * 4/1961 Uhleen .................. B65G 39/02
                                                      118/101
(Continued)

FOREIGN PATENT DOCUMENTS

CN    101489893    7/2009
CN    203959824    11/2014
(Continued)

OTHER PUBLICATIONS

"Notice of Allowance of Taiwan Counterpart Application," dated Jul. 4, 2017, p. 1-p. 4, in which the listed references were cited.

*Primary Examiner* — Gene O Crawford
*Assistant Examiner* — Keith R Campbell
(74) *Attorney, Agent, or Firm* — JCIPRNET (57) ABSTRACT

A roller assembly for transporting a substrate includes a step roller and a plurality of first auxiliary rollers. The step roller includes a main roller, and a pair of edge rollers sleeved on the main roller and located on two opposite ends of the main roller, respectively. The plurality of first auxiliary rollers are disposed on two opposite sides of the step roller, respectively. A first film forms a closed loop through the first film being rolled on the plurality of first auxiliary rollers and the step roller cyclically. A method using the same is also provided.

20 Claims, 6 Drawing Sheets

(51) Int. Cl.
  *B65H 23/34* (2006.01)
  *B65G 39/02* (2006.01)
  *B65H 27/00* (2006.01)
(52) U.S. Cl.
  CPC ......... *B65H 27/00* (2013.01); *B65G 2207/02* (2013.01); *B65H 2301/4422* (2013.01); *B65H 2301/44312* (2013.01); *B65H 2404/1321* (2013.01); *B65H 2404/262* (2013.01)
(58) Field of Classification Search
  CPC ............ B65H 27/00; B65H 2301/4191; B65H 2301/44312; B65H 2404/1118; B65H 2404/1119; B65H 2404/2611; B65H 2404/262; B65H 2601/25; B65H 2601/2532; B65H 2601/254; B65H 2701/194; B65H 2701/1942; B65H 2801/61; B65H 2801/72; B65H 2801/87; H05K 13/02; H05K 2203/1545
  See application file for complete search history.

(56) References Cited

U.S. PATENT DOCUMENTS

| | | | |
|---|---|---|---|
| 4,132,617 A * | 1/1979 | Noz | C25D 5/02 |
| | | | 204/202 |
| 4,145,040 A | 3/1979 | Huber | |
| 4,437,659 A | 3/1984 | Caron et al. | |
| 4,973,991 A | 11/1990 | Raijmahers | |
| 5,678,119 A * | 10/1997 | Tamaki | B65H 5/025 |
| | | | 396/618 |
| 5,975,178 A * | 11/1999 | Otsuka | B32B 37/0053 |
| | | | 156/351 |
| 6,234,225 B1 * | 5/2001 | Tanaka | H01M 4/04 |
| | | | 118/66 |
| 6,427,941 B1 | 8/2002 | Hikita | |
| 8,544,156 B2 * | 10/2013 | Morris | B65H 20/02 |
| | | | 26/18.6 |
| 8,936,243 B1 | 1/2015 | Muir et al. | |
| 9,242,828 B2 | 1/2016 | Mader | |
| 9,902,563 B2 * | 2/2018 | Iwata | H01M 10/0404 |
| 9,902,564 B1 * | 2/2018 | Huang | B65H 20/14 |
| 9,908,732 B2 * | 3/2018 | Oudsen | B65H 23/34 |
| 2006/0175372 A1 * | 8/2006 | Brost | B65H 3/0638 |
| | | | 226/3 |
| 2014/0069568 A1 * | 3/2014 | Mohapatra | H05K 13/02 |
| | | | 156/64 |
| 2014/0284412 A1 | 9/2014 | Merz et al. | |
| 2015/0238995 A1 | 8/2015 | Ohba et al. | |
| 2017/0305700 A1 * | 10/2017 | Jerry | B65H 23/0258 |

FOREIGN PATENT DOCUMENTS

| | | |
|---|---|---|
| JP | 201064013 | 3/2010 |
| TW | M418115 | 12/2011 |
| TW | 201531408 | 8/2015 |

* cited by examiner

ROLLER ASSEMBLY AND METHOD FOR TRANSPORTING A SUBSTRATE USING THE SAME

TECHNICAL FIELD

The technical field relates to a roller assembly and a method for transporting a substrate using the same.

BACKGROUND

During the roll-to-roll processing in roller assemblies, when substrates or films are transported from one roller to another roller, the substrates or films may have patterns that were formed on the substrates. In order to prevent the patterns from being damaged, the substrates or films are transported through a step roller so that the patterns do not contact the rollers directly. Since the patterns do not contact the rollers through the step roller, the substrates or films are transported without damaging the patterns on them.

However, conventional step rollers do not support the middle of the substrate or film they are transporting because the patterns are in the middle of the substrate. During transporting the substrate through the step roller, stress is generated towards the substrate from the bending moment. Because the substrate is not supported in the middle, the stress generated from the bending moment may cause the substrate or film to be wrinkled or damaged. If the substrate is damaged, the substrate is not able to be properly transported. In addition, the pattern on the substrate may also be damaged.

SUMMARY

An exemplary embodiment of the disclosure provides a roller assembly for transporting a substrate. The roller assembly includes a step roller and a plurality of first auxiliary rollers. The step roller includes a main roller and a pair of edge rollers disposed on the main roller and located on two opposite ends of the main roller, respectively. The plurality of first auxiliary rollers are disposed on two opposite sides of the step roller, respectively. A first film forms a closed loop through the first film being rolled on the plurality of first auxiliary rollers and the step roller cyclically.

An exemplary embodiment of the disclosure provides a method for transporting a substrate by using a roller assembly. The substrate is radially transported and passes through a step roller. A first film is attached to the substrate and used as a stacked film before the substrate is transported and passes through the step roller. Two edges of the stacked film are supported by a pair of edge rollers. The pair of edge rollers are sleeved on a main roller of the step roller and are located on two opposite ends of the main roller, respectively.

The foregoing will become better understood from a careful reading of a detailed description provided herein below with appropriate reference to the accompanying drawings.

DESCRIPTION OF THE EMBODIMENTS

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 1:
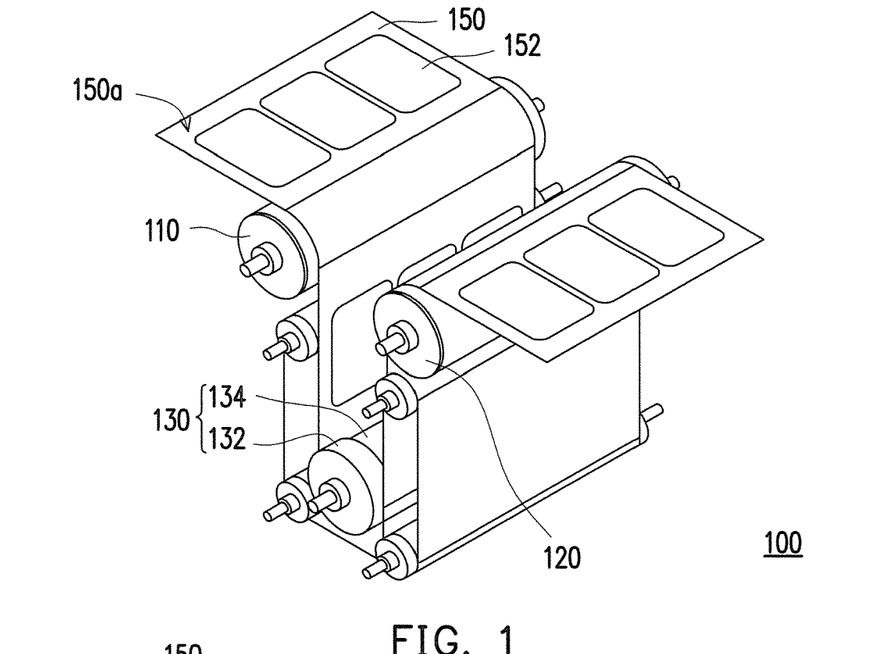
FIG. 1 is a three-dimensional schematic diagram of a roller assembly according to an embodiment of this disclosure.
Figure 2:
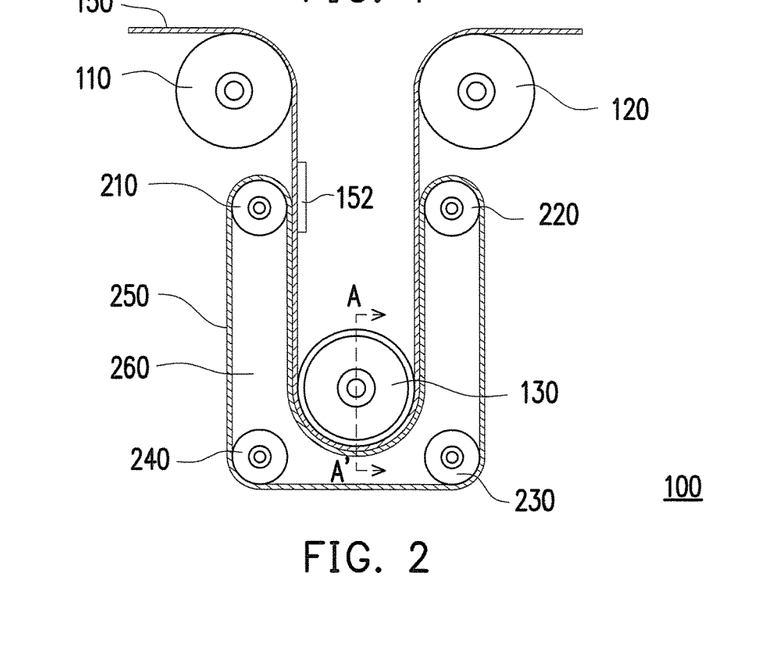
FIG. 2 is a schematic side view of the roller assembly of FIG. 1.

FIG. 1 is a three-dimensional schematic diagram of a roller assembly according to an embodiment of this disclosure. FIG. 2 is a schematic side view of the roller assembly of FIG. 1. Referring to FIG. 1 and FIG. 2, in the embodiment, a roller assembly 100 comprises a first transport roller 110, a second transport roller 120, a step roller 130 and four first auxiliary rollers 210, 220, 230, and 240. The four first auxiliary rollers 210, 220, 230, and 240 are disposed on two opposite sides of the step roller 130, respectively. A first film 250 forms a closed loop 260 through the first film 250 being rolled on the four first auxiliary rollers 210, 220, 230, and 240 and the step roller 130 cyclically. The roller assembly 100 is suitable for the roll-to-roll processing. The first transport roller 110 and the second transport roller 120 are disposed on two opposite sides of the step roller 130, respectively. A substrate 150 with patterns 152 is transported from the first transport roller 110 to the second transport roller 120 through the step roller 130. In other embodiments, the substrate 150 that is transported does not have to include patterns 152. The material of the substrate 150 is, for example, any suitable material to be processed in the roll-to-roll processing such as paper, glass, polyethylene terephthalate (PET), polyimide (PI), or Polyurethane (PU). The patterns 152 are any suitable patterns formed on the substrate 150 desired by the user. The material of the patterns 152 are, for example, semiconductor material, metal, organic material, or other suitable materials. The patterns 152 are, for example, printed or deposited on the substrate 150. However, the disclosure is not limited thereto, and the patterns 152 may be formed on the substrate 150 by other suitable methods. In the embodiment, multiple patterns 152 are shown. However, the disclosure is not limited thereto, and the number of patterns 152 may be determined and adjusted according to user requirements.

In the embodiment, when the substrate 150 is transported from the first transport roller 110 to the second transport roller 120, a side 150a with the patterns 152 faces away from the first transport roller 110 and the second transport roller 120. In other words, the side 150a with the patterns 152 does not contact the first transport roller 110 and the second transport roller 120 so that the patterns 152 are not damaged while the substrate 150 is rolling on the first transport roller 110 and the second transport roller 120. In addition, the side 150a with the patterns 152 faces the step roller 130. Specifically, as seen in FIG. 1, the step roller 130 comprises a pair of edge rollers 132 and a main roller 134. The pair of edge rollers 132 are sleeved on the main roller 134 and located on two opposite ends of the main roller 134, respectively. Before the substrate 150 is transported through the step roller 130, the first film 250 is attached to the substrate 150 and used as a stacked film. When the stacked film is transported through the step roller 130, the side 150a of the substrate 150 with the patterns 152 is in contact with the pair of edge rollers 132 or not in contact with the pair of edge rollers 132. Since the pair of edge rollers 132 support the two sides of the stacked film, the patterns 152 are not in contact with the pair of edge rollers 132 or the main roller 134. In this way, the patterns 152 are not damaged when the substrate 150 is transported through the step roller 130. As the stacked film is transported through the step roller 130, the pair of edge rollers 132 and the main roller 134 rotate together. The pair of edge rollers 132 are fixed to the main roller 134 through, for example, welding, adhering, fastening, or other suitable methods such that the pair of edge rollers 132 rotate with the main roller 134. In other embodiments, the edge rollers 132 and the main roller 134 is integrally formed.

In the embodiment, a distance between a center of each of the four first auxiliary rollers 210, 220, 230, and 240 and a center of the step roller 130 is less than a distance between a center of each of the first transport roller 110 and the second transport roller 120 and the center of the step roller 130 respectively. The first film 250 is rolled by following a path from the first auxiliary roller 210, through the step roller 130, the first auxiliary roller 220, the first auxiliary roller 230 and the first auxiliary roller 240, and then back to the first auxiliary roller 210. The substrate 150 is transported in the direction from the first transport roller 110 and through the step roller 130 to the second transport roller 120. A rolling direction of the first film 250 and a transporting direction of the substrate 150 are the same. A rolling speed of the first film 250 and a transporting speed of the substrate 150 are the same. In other words, the first film 250 is attached to the substrate 150 and used as the stacked film before the substrate 150 is transported and passes through the step roller 130. The substrate 150 and the first film 250 (that is the stacked film) are transported together through the step roller 130, which not only increases the thickness of the substrate 150 but also enhances a high stress strength or stiffness of the stacked film. In this way, it may prevent the substrate 150 from being wrinkled or damaged when the substrate 150 is transported and passes through the step roller 130. Finally the substrate 150 is separated from the first film 250 after the stacked film passes through the step roller 130. A material of the first film 250 may be any of suitable materials used in a roll-to-roll processing such as paper, glass, plastic, Polymer, stainless steel, polyethylene terephthalate (PET) and so on.

Figure 3:
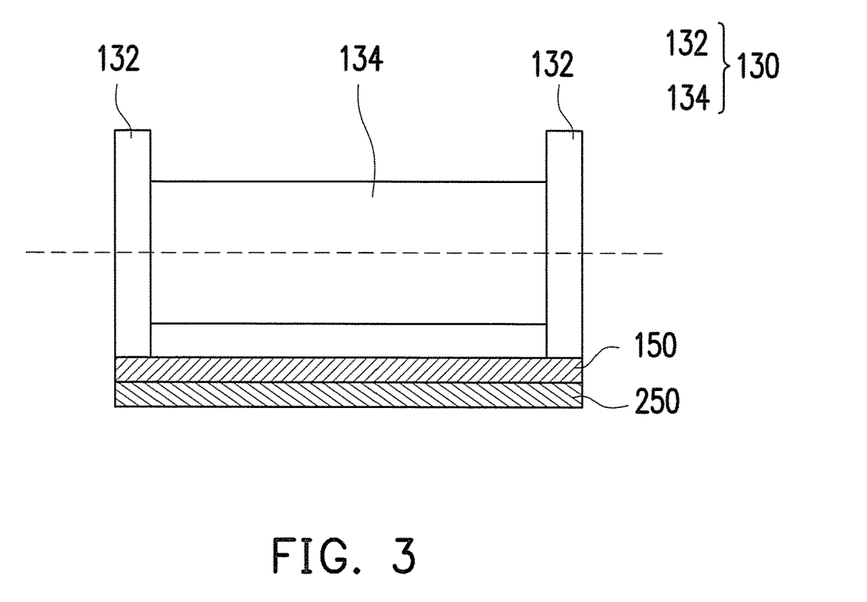
FIG. 3 and FIG. 4 are two schematic cross-sectional views along the line AA' in FIG. 2, respectively, according to an embodiment of this disclosure.
Figure 4:
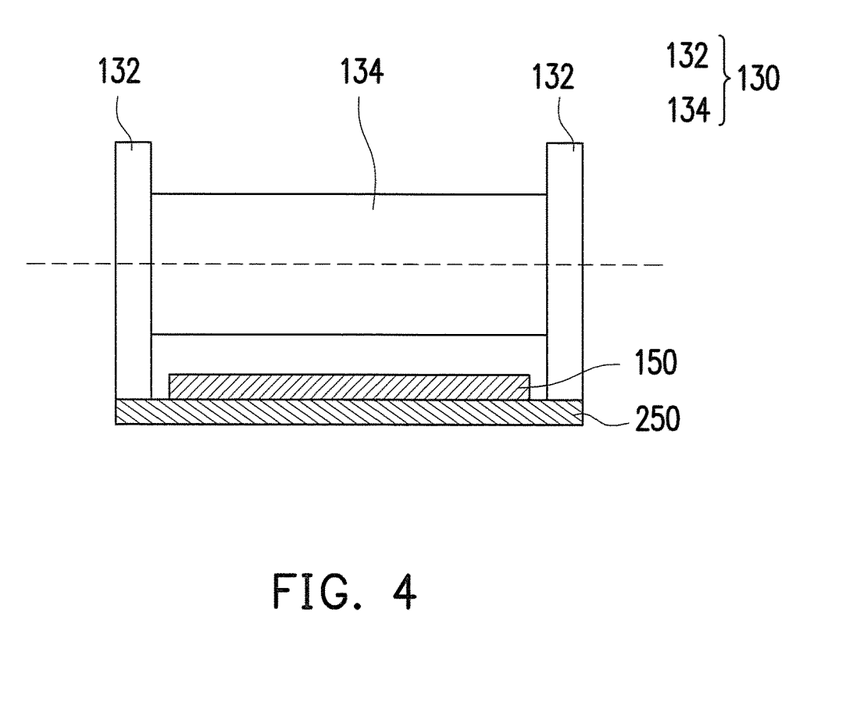

FIG. 3 and FIG. 4 are two schematic cross-sectional views along the line AA' in FIG. 2, respectively, according to an embodiment of this disclosure. Referring to FIG. 3, a width of the substrate 150 is substantially equal to a width of the first film 250. The first film 250 is attached to the substrate 150 and used as the stacked film. When the stacked film is transported through the step roller 130, the substrate 150 is in contact with the pair of edge rollers 132. Referring to FIG. 4, a width of the substrate 150 is less than a width of the first film 250. When the stacked film is transported through the step roller 130, the substrate 150 is not in contact with the pair of edge rollers 132 but the first film 250 is in contact with the pair of edge rollers 132. In the embodiment of FIG. 3 and FIG. 4, the first film 250 is attached to the substrate 150 through an adhesive or an electrostatic adhesion. The first film 250 is a detachable and reused film when the first film 250 is attached to the substrate 150 by using an adhesive. The first film 250 is an electrostatic adhesion film when the first film 250 is attached to the substrate 150 by using an electrostatic adhesion.

Figure 5:
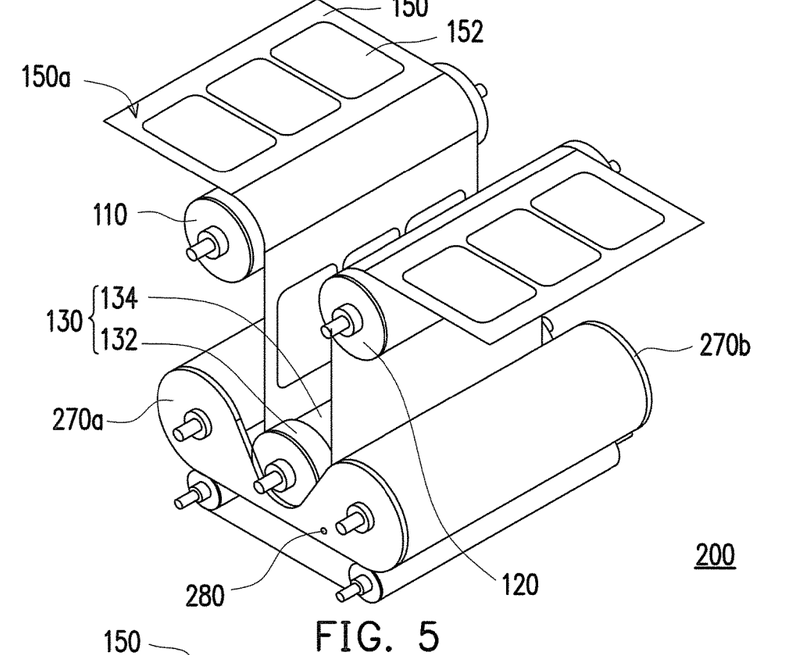
FIG. 5 is a three-dimensional schematic diagram of a roller assembly according to another embodiment of this disclosure.
Figure 6:
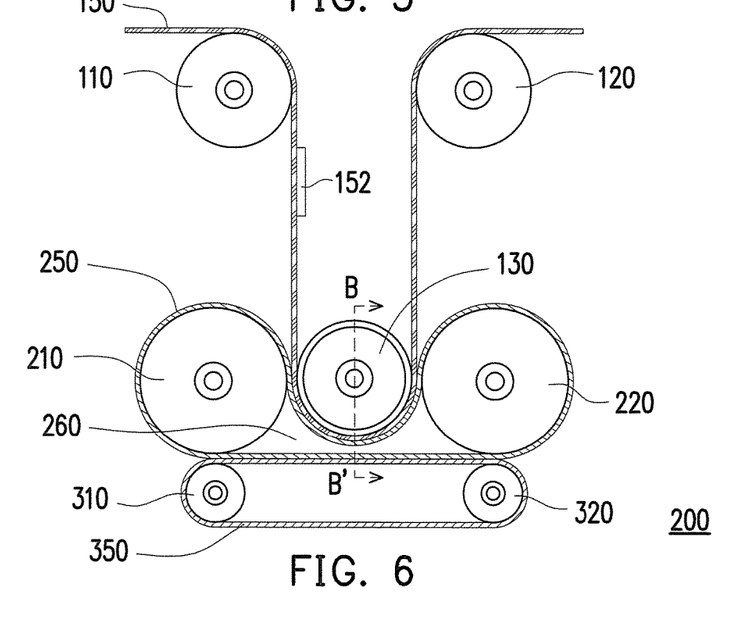
FIG. 6 is a schematic side view of the roller assembly of FIG. 5.

FIG. 5 is a three-dimensional schematic diagram of a roller assembly according to another embodiment of this disclosure. FIG. 6 is a schematic side view of the roller assembly of FIG. 5. Referring to FIG. 5 and FIG. 6, the embodiment of FIG. 5 and FIG. 6 is similar to the embodiment of FIG. 1 and FIG. 2. Similar elements will use the same reference numerals, and the same description will not be repeated herein. The difference between the two embodiments is that the two first auxiliary rollers 230, 240 are removed and two second auxiliary rollers 310, 320 are additionally provided in the embodiment of FIG. 5 and FIG. 6. A roller assembly 200 comprises a first transport roller 110, a second transport roller 120, a step roller 130, two first auxiliary rollers 210 and 220, and two second auxiliary rollers 310 and 320. The two first auxiliary rollers 210 and 220 are disposed on two opposite sides of the step roller 130, respectively. The first film 250 forms the closed loop 260 through the first film 250 being rolled on the two first auxiliary rollers 210 and 220 and the step roller 130 cyclically. The two second auxiliary rollers 310 and 320 are disposed adjacent to the two first auxiliary rollers 210 and 220. A second film 350 is rolled on the two second auxiliary rollers 310 and 320 cyclically. The roller assembly 200 is suitable for the roll-to-roll processing. A rolling direction and a rolling speed of the second film 350 are the same as the rolling direction and the rolling speed of the first film 250 during the second film 350 is in contact with the first film 250. So that the second film 350 and the first film 250 are rolled together during the second film 350 is in contact with the first film 250. A material of the second film 350 may be any of suitable materials used in a roll-to-roll processing such as paper, glass, plastic, Polymer, stainless steel, polyethylene terephthalate (PET) and so on.

In the embodiment, a distance between a center of each of the two first auxiliary rollers 210 and 220 and a center of the step roller 130 is less than a distance between a center of each of the first transport roller 110 and the second transport roller 120 and the center of the step roller 130. The first film 250 is rolled by following a path from the first auxiliary roller 210, through the step roller 130 and the first auxiliary roller 220, and then back to the first auxiliary roller 210. The substrate 150 is transported in the direction from the first transport roller 110 and through the step roller 130 to the second transport roller 120. The rolling direction of the first film 250 and the transporting direction of the substrate 150 are the same. The rolling speed of the first film 250 and the transporting speed of the substrate 150 are the same. In other words, the first film 250 is attached to the substrate 150 and used as the stacked film before the substrate 150 is transported through the step roller 130. The substrate 150 and the first film 250 (that is the stacked film) are transported together through the step roller 130, which not only increases the thickness of the substrate 150 but also enhances a high stress strength or stiffness of the stacked film. In this way, it may prevent the substrate 150 from being wrinkled or damaged when the substrate 150 is transported and passes through the step roller 130. Finally the substrate 150 is separated from the first film 250 after the stacked film is transported and passes through the step roller 130.

Further referring to the embodiment of FIG. 5, the roller assembly 200 further comprises a pair of side boards 270a and 270b disposed at two ends of the two first auxiliary rollers 210 and 220, respectively. The pair of side boards 270a and 270b and the first film 250 form a closed chamber. That is, the pair of side boards 270a and 270b and the closed loop 260 form the closed chamber. The pair of side boards 270a and 270b comprise an air suction hole 280 to suck the air in the closed chamber. The first film 250 is breathable and the second film 350 is airtight. The air suction hole 280 is adapted to suck the air in the closed chamber, thereby generating a vacuum force to pull the substrate 150 downward. The substrate 150 is thus attached to the first film 250 before the substrate 150 is transported and passes through the step roller 130. In the embodiment, the first film 250 is breathable and the second film 350 is airtight. The substrate 150 is attached to the first film 250 by the vacuum force. In this way, it may also prevent the substrate 150 from being wrinkled or damaged when the substrate 150 is transported and passes through the step roller 130. Finally the substrate 150 is separated from the first film 250 after the stacked film passes through the step roller 130.

Figure 7:
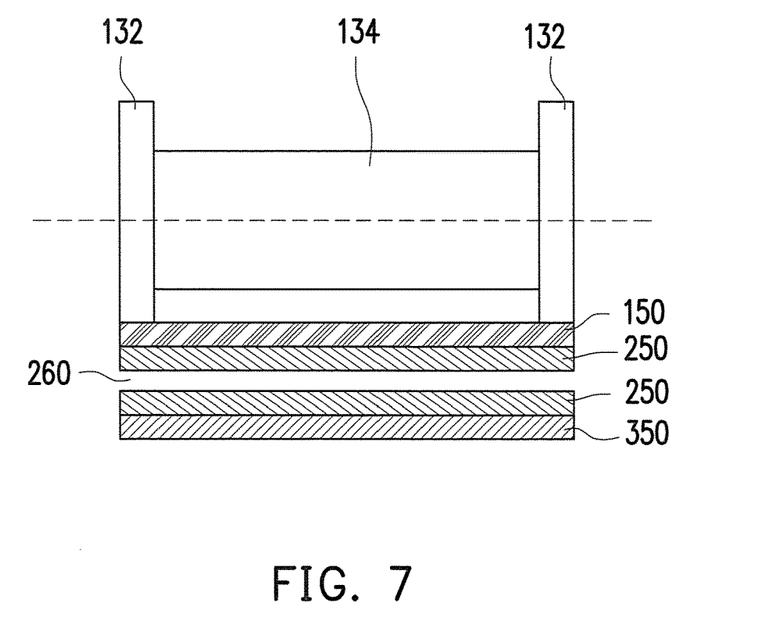
FIG. 7 and FIG. 8 are two schematic cross-sectional views along the line BB' in FIG. 6, respectively, according to another embodiment of this disclosure.
Figure 8:
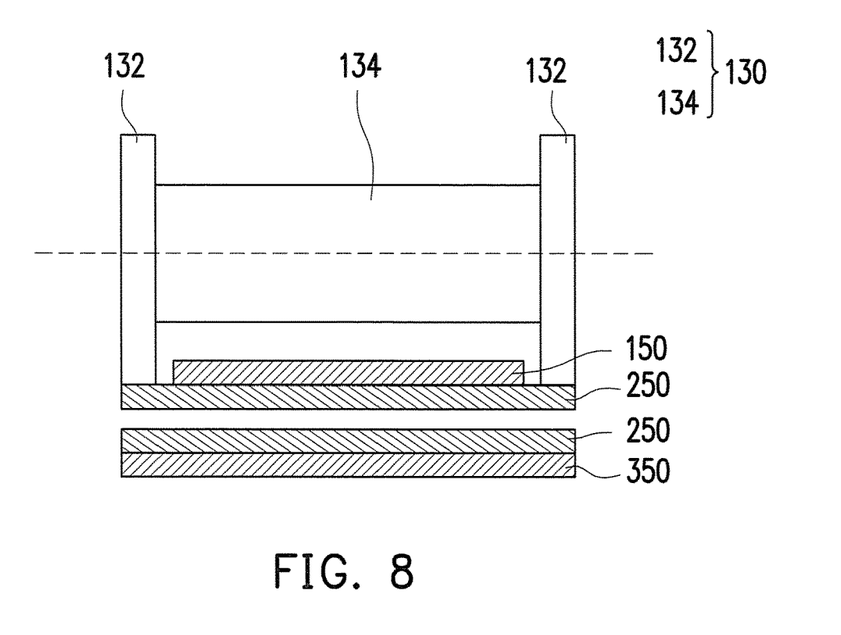

FIG. 7 and FIG. 8 are two schematic cross-sectional views along the line BB' in FIG. 6, respectively, according to another embodiment of this disclosure. Referring to FIG. 7, a width of the substrate 150 is substantially equal to a width of the first film 250. When the stacked film is transported and passes through the step roller 130, the substrate 150 is in contact with the pair of edge rollers 132. Referring to FIG. 8, a width of the substrate 150 is less than a width of the first film 250. When the stacked film is transported and passes through the step roller 130, the substrate 150 is not in contact with the pair of edge rollers 132 but the first film 250 is in contact with the pair of edge rollers 132. In the embodiment of FIG. 7 and FIG. 8, the first film 250 is attached to the substrate 150 by applying an adhesive, an electrostatic adhesion or a vacuum force.

Figure 9:
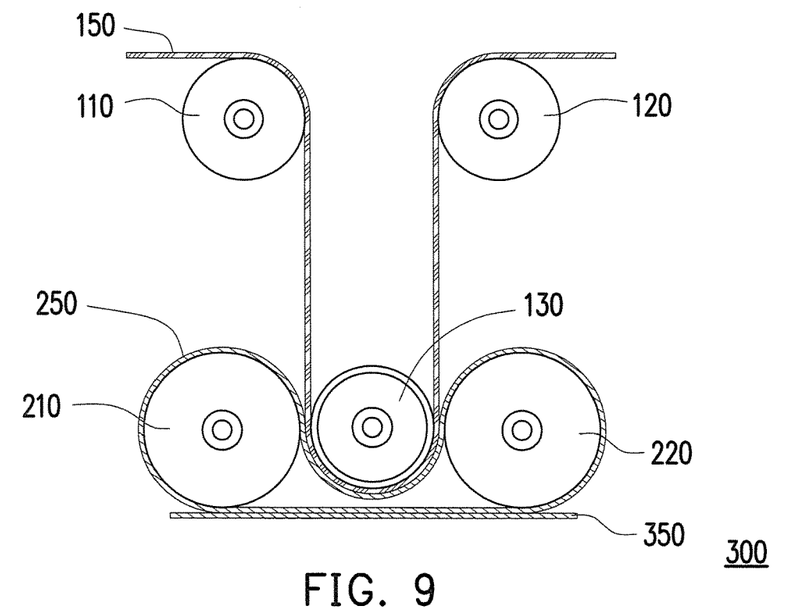
FIG. 9 is a schematic side view of a roller assembly according to alternative embodiment of this disclosure.

FIG. 9 is a schematic side view of a roller assembly according to alternative embodiment of this disclosure. Referring to FIG. 9, the embodiment of FIG. 9 is similar to the embodiment of FIG. 6. Similar elements will use the same reference numerals, and the same description will not be repeated herein. The difference between the two embodiments is that the two second auxiliary rollers 310 and 320 are removed but the second film 350 is remained in the embodiment of FIG. 9. The roller assembly 300 is suitable for the roll-to-roll processing. The second film 350 is in contact with the first film 250 and adjacent to the two first auxiliary rollers 210 and 220. The second film 350 isn't rolled on any of rollers cyclically. In the embodiment, none of the two second auxiliary rollers 310 and 320 roll the second film 350. That is, it will not occur that the second film 350 and the first film 250 are rolled together. Therefore, the two first auxiliary rollers 210 and 220 require more energy to roll the first film 250. In the embodiment of FIG. 9, the first film 250 is attached to the substrate 150 by applying an adhesive, an electrostatic adhesion or a vacuum force.

Figure 10:
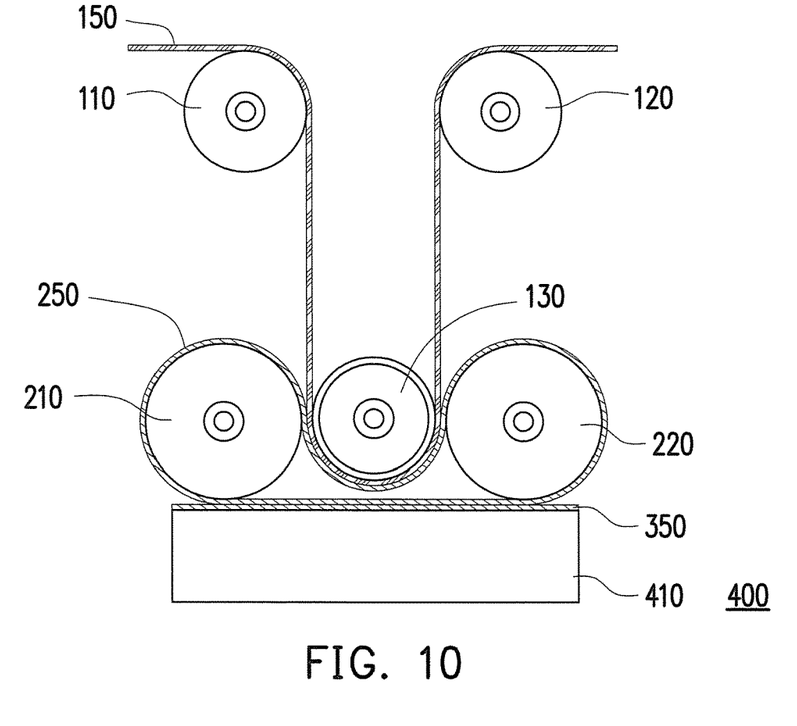
FIG. 10 is a schematic side view of a roller assembly according to another embodiment of this disclosure.

FIG. 10 is a schematic side view of a roller assembly according to another embodiment of this disclosure. Referring to FIG. 10, the embodiment of FIG. 10 is similar to the embodiment of FIG. 9. Similar elements will use the same reference numerals, and the same description will not be repeated herein. The difference between the two embodiments is that a bottom board 410 is additionally provided in the embodiment of FIG. 10. The roller assembly 400 is suitable for roll to roll processing. The bottom board 410 is disposed adjacent to the two first auxiliary rollers 210 and 220. The second film 350 is disposed on the bottom board 410 and is in contact with the first film 250. In the embodiment of FIG. 10, the first film 250 is attached to the substrate 150 by applying an adhesive, an electrostatic adhesion or a vacuum force.

In the embodiments of FIG. 5, FIG. 6, FIG. 9 and FIG. 10, when the first film 250 is attached to the substrate 150 by applying an adhesive or an electrostatic adhesion, it does not matter whether the second film 350 is airtight or not. When the first film 250 is attached to the substrate 150 by applying a vacuum force, the first film 250 is breathable but the second film 350 is airtight. Specifically in the embodiment of FIG. 10, at least one of the second film 350 and the bottom board 410 is airtight. It may also allow both the second film 350 and the bottom board 410 are airtight.

Figure 11:
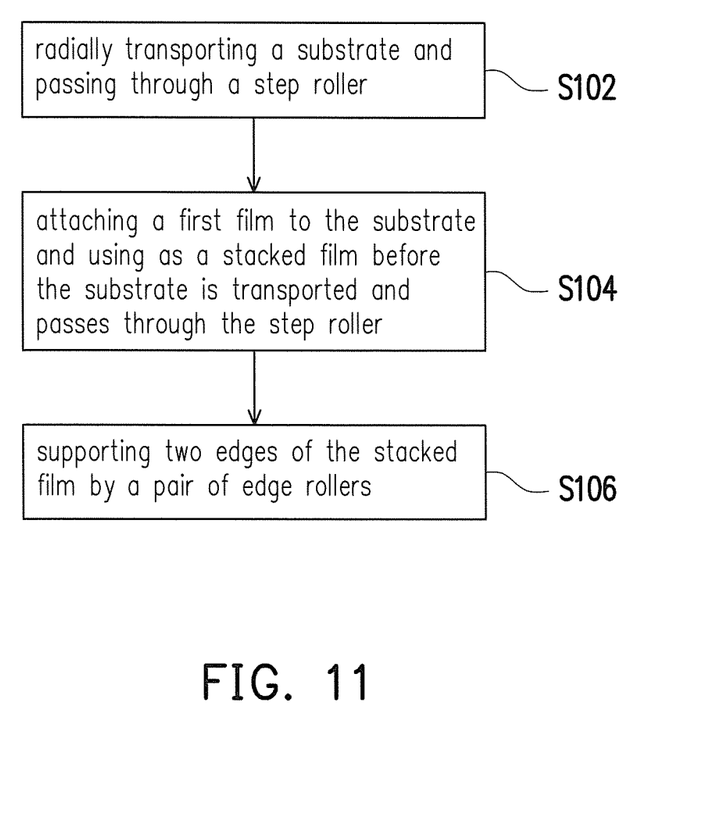
FIG. 11 is a flow chart of a method of transporting a substrate by using a roller assembly according to an embodiment of the disclosure.

FIG. 11 is a flow chart of a method of transporting a substrate by using a roller assembly according to an embodiment of the disclosure. In step S102, a substrate 150 is radially transported and passes through a step roller 130. Specifically, the substrate 150 is radially transported from a first transport roller 110 and through the step roller 130 to a second transport roller 120. In step S104, a first film 250 is attached to the substrate 150 and used as a stacked film before the substrate 150 is transported and passes through the step roller 130. In step S106, the edges of the stacked film are supported by a pair of edge rollers 132. The pair of edge rollers 132 are disposed on a main roller 134 of the step roller 130 and are located on two opposite ends of the main roller 134, respectively. During transporting the substrate 150 and passing through the step roller 130, the pair of edge rollers 132 and the main roller 134 rotate while the substrate 150 is being transported. The main roller 134 rotates with the pair of edge rollers 132 while the substrate 150 is being transported. Furthermore, in step S104, forming a closed loop through the first film 250 being rolled on at least two first auxiliary rollers 210 and 220 and the step roller 130 cyclically. A rolling direction of the first film 250 and a transporting direction of the substrate 150 are the same, and a rolling speed of the first film 250 and a transporting speed of the substrate 150 are the same. A method of attaching the first film 250 to the substrate 150 comprises applying an adhesive, an electrostatic adhesion or a vacuum force.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:
1. A roller assembly for transporting a substrate, comprising:
a step roller, comprising:
  a main roller; and
  a pair of edge rollers, disposed on the main roller and located on two opposite ends of the main roller, respectively; and
a plurality of first auxiliary rollers disposed on two opposite sides of the step roller, respectively, wherein a first film forms a closed loop through the first film being rolled on the plurality of first auxiliary rollers and the step roller cyclically.

2. The roller assembly as claimed in claim 1, further comprising:
   a first transport roller and a second transport roller, disposed on two opposite sides of the step roller, respectively, wherein the substrate is transported from the first transport roller, and through the step roller to the second transport roller.

3. The roller assembly as claimed in claim 2, wherein a distance between a center of each of the plurality of first auxiliary rollers and a center of the step roller is less than a distance between a center of each of the first transport roller and the second transport roller and the center of the step roller, respectively.

4. The roller assembly as claimed in claim 1, wherein a width of the substrate is less than or equal to a width of the first film.

5. The roller assembly as claimed in claim 2, wherein the first film is attached to the substrate before the substrate is transported and passes through the step roller.

6. The roller assembly as claimed in claim 5, wherein the first film is attached to the substrate by applying an adhesive or an electrostatic adhesion.

7. The roller assembly as claimed in claim 6, wherein the first film is a detachable and reused film when the first film is attached to the substrate by applying an adhesive.

8. The roller assembly as claimed in claim 1, wherein a material of the first film is at least one of paper, glass, plastic, polymer, stainless steel and polyethylene terephthalate.

9. The roller assembly as claimed in claim 1, wherein a number of the plurality of first auxiliary rollers is at least two.

10. The roller assembly as claimed in claim 9, wherein the number of the plurality of first auxiliary rollers is an even number greater than two.

11. The roller assembly as claimed in claim 1, further comprising:
    a pair of side boards, disposed at two ends of the plurality of first auxiliary rollers, respectively, wherein the pair of side boards and the first film form a closed chamber; and
    a second film, being in contacted with the first film and adjacent to at least two of the plurality of first auxiliary rollers.

12. The roller assembly as claimed in claim 11, further comprising:
    two second auxiliary rollers, disposed adjacent to the plurality of first auxiliary rollers, wherein the second film is rolled on the two second auxiliary rollers cyclically.

13. The roller assembly as claimed in claim 11, further comprising:
    a bottom board disposed adjacent to the plurality of first auxiliary rollers, wherein the second film is disposed on the bottom board.

14. The roller assembly as claimed in claim 11, wherein the first film is breathable but the second film is airtight.

15. The roller assembly as claimed in claim 14, wherein the pair of side boards comprise an air suction hole, wherein air is adapted to be sucked by the air suction hole.

16. The roller assembly as claimed in claim 15, wherein the first film is attached to the substrate by applying a vacuum force from the closed chamber.

17. A method for transporting a substrate with a roller assembly, comprising:
    radially transporting the substrate and passing through a step roller;
    attaching a first film to the substrate and using as a stacked film before the substrate is transported and passes through the step roller; and
    supporting two edges of the stacked film by a pair of edge rollers, wherein the pair of edge rollers are sleeved on a main roller of the step roller and are located on two opposite ends of the main roller, respectively.

18. The method as claimed in claim 17, wherein the pair of edge rollers rotate while the substrate is being transported.

19. The method as claimed in claim 18, wherein the main roller rotates with the pair of edge rollers while the substrate is being transported.

20. The method as claimed in claim 17, wherein a rolling direction of the first film and a transporting direction of the substrate are the same, and a rolling speed of the first film and a transporting speed of the substrate are the same.

* * * * *